United States Patent [19]
Uchinishi

[11] Patent Number: 4,570,439
[45] Date of Patent: Feb. 18, 1986

[54] EXHAUST CONTROL SYSTEM FOR 2-CYCLE ENGINES

[75] Inventor: Eizaburo Uchinishi, Hyogo, Japan

[73] Assignee: Kawasaki Jukogyo Kabushiki Kaisha, Kobe, Japan

[21] Appl. No.: 680,505

[22] Filed: Dec. 11, 1984

[30] Foreign Application Priority Data

Dec. 12, 1983 [JP] Japan .................. 58-234700
Dec. 29, 1983 [JP] Japan .................. 58-248125

[51] Int. Cl.⁴ .................................. F02B 27/02
[52] U.S. Cl. ........................... 60/314; 60/312
[58] Field of Search .................. 60/312, 313, 314

[56] References Cited

U.S. PATENT DOCUMENTS 4,522,029 6/1985 Tomita .................. 60/314

FOREIGN PATENT DOCUMENTS 132321 9/1980 Japan .................. 60/314

Primary Examiner—Douglas Hart
Attorney, Agent, or Firm—Leydig, Voit & Mayer Ltd.

[57] ABSTRACT

An exhaust control system for 2-cycle engines has a main exhaust passage, auxiliary exhaust passages arranged in parallel with the main exhaust passage, and an expansion chamber communicatable with the main exhaust passage. During low-speed operation of the engine, the auxiliary exhaust passages are shut-off while the expansion chamber is connected to the main exhaust passage, whereas, during high-speed operation of the engine, the auxiliary exhaust passages are opened and the expansion chamber is closed.

1 Claim, 9 Drawing Figures

FIG.I
PRIOR ART
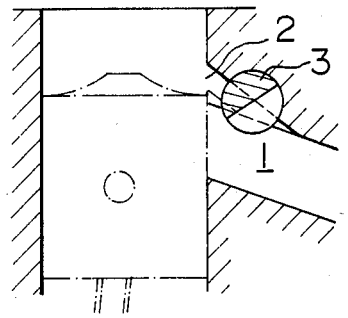
FIG.2
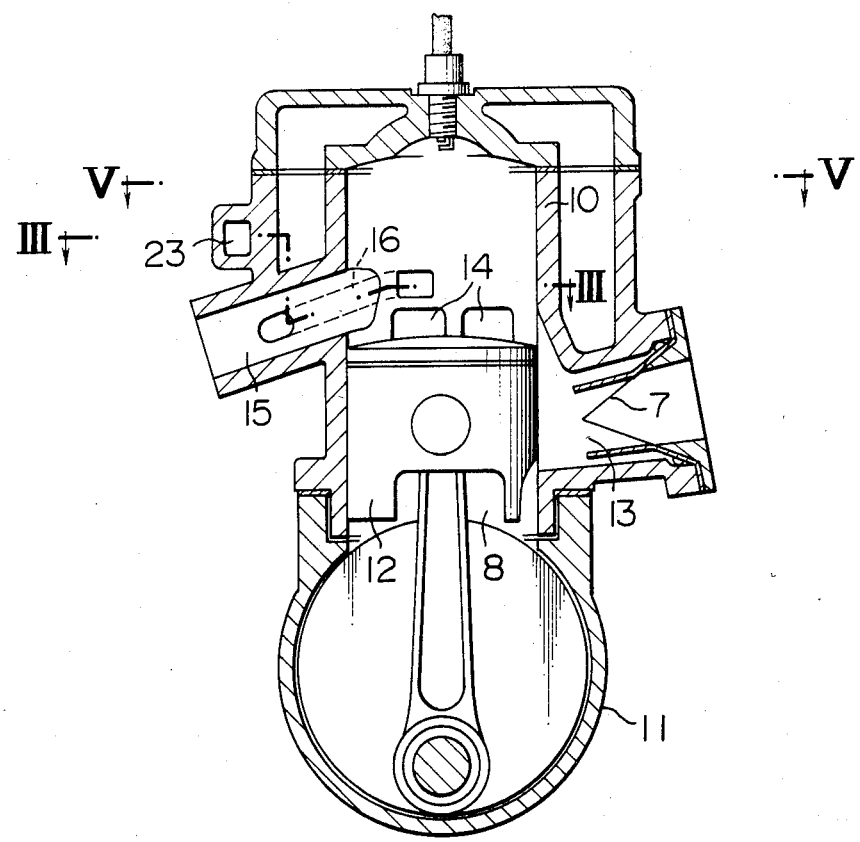

ately shut off the auxiliary exhaust passages and, as 
EXHAUST CONTROL SYSTEM FOR 2-CYCLE ENGINES

FIELD OF THE INVENTION

The present invention relates to an exhaust control system for 2-cycle engines used, for example, in motorcycles.

BRIEF DESCRIPTION OF THE DRAWINGS

FIG. 1 is a vertical sectional view of a conventional exhaust control system;

FIG. 2 is a vertical sectional view of a 2-cycle engine incorporating the exhaust control system of the invention;

BACKGROUND OF THE INVENTION

Figure 3:
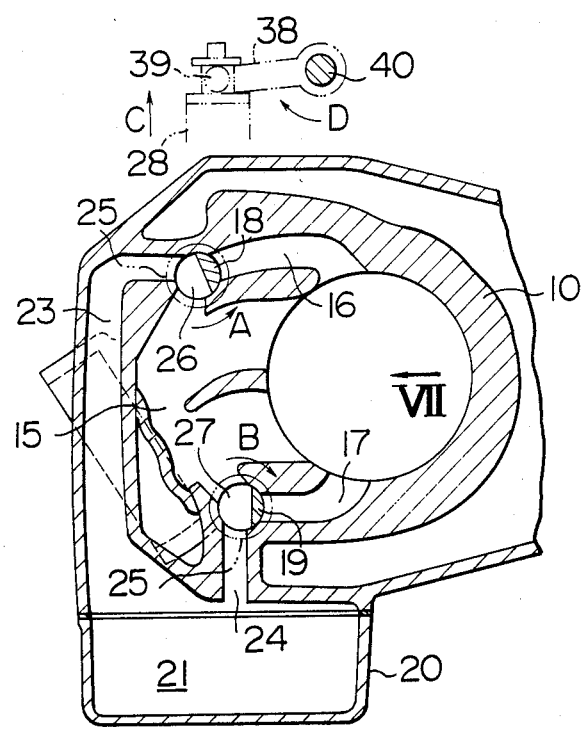
FIG. 3 is a sectional view taken along the line III—III of FIG. 2, showing the operation of the exhaust control system during low-speed operation of the engine.
Figure 4:
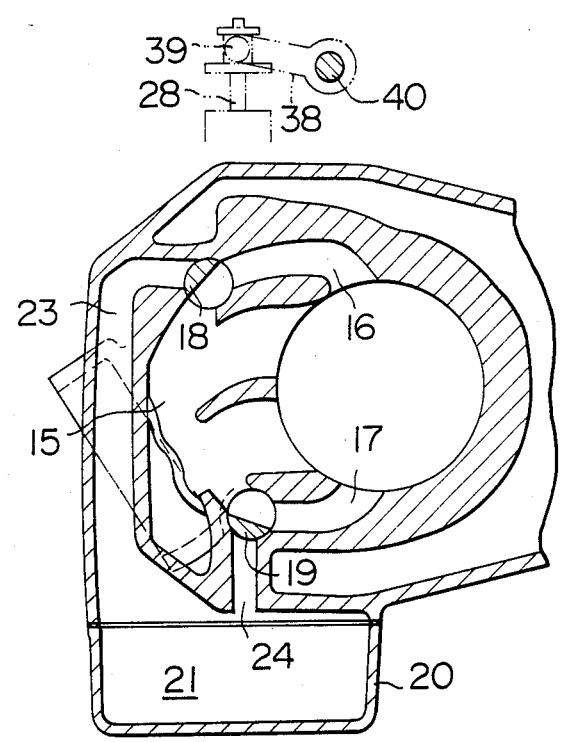
FIG. 4 is a sectional view taken along the line III—III of FIG. 2 showing the operation of the exhaust control system during high-speed operation of the engine.

As will be seen from FIG. 1, a conventional exhaust control system of a 2-cycle engine has an auxiliary exhaust passage 2 formed in the cylinder wall and opening into the combustion chamber at a level slightly above a main exhaust passage 1. The other end of the auxiliary exhaust passage 2 opens in an intermediate portion of the main exhaust passage 1. A valve 3 is disposed in the auxiliary exhaust passage 2. The rotational position of this valve 3 is varied in accordance with the engine speed such as to provide an optimum opening area of the auxiliary exhaust passage and, hence, the total area of exhaust system presented by both the main and auxiliary exhaust passages for varying engine speed.

This exhaust control system, however, does not provide an appreciable increase of the engine power due to pulsation of the exhaust gas particularly in the low-speed range of the engine operation.

To obviate this problem, it has been proposed to provide an expansion chamber in communication with the exhaust passage. In such a case, however, the expansion chamber undesirably impairs the smooth flow of the exhaust gas particularly during high-speed engine operation.

SUMMARY OF THE INVENTION

Accordingly, an object of the invention is to provide an exhaust control system which can increase the power of the engine over the entire speed range of the engine operation.

To this end, according to the invention, there is provided an exhaust control system for 2-cycle engine comprising: a main exhaust passage opening into the combustion chamber; auxiliary exhaust passages opening into the combustion chamber at both sides of the main exhaust passage and leading to an intermediate portion of the main exhaust passage; control valves provided in respective auxiliary exhaust passages and adapted to selectively shut-off the auxiliary exhaust passages; an expansion chamber communicatable with the main exhaust passage through the control valves; and a valve operating means for operating the control valves such that, when the engine is operating at low speed, the control valves allow the expansion chamber to be communicated with the main exhaust passage while shutting off the auxiliary exhaust passages and, as the engine speed is increased, the control valves gradually shut off the expansion chamber from the main exhaust passage while gradually opening the auxiliary exhaust passages.

The above and other objects, features and advantages of the invention will become clear from the following description of the preferred embodiments.

DESCRIPTION OF THE PREFERRED EMBODIMENTS:

Referring to FIG. 2, a 2-cycle engine has a cylinder 10 which reciprocatably receives a piston 12. In the wall of the cylinder 10 are formed passages such as a suction passage 13, scavenging passages 14 and a main exhaust passage 15. The suction passage 13 has a reed valve 7 adapted to be opened in accordance with the stroking of the piston 12 such as to allow the combustion chamber to communicate with a crank chamber 8 which is defined by a crank case 11, piston 12 and a portion of the cylinder 10. The scavenging passages 14 communicate at their lower ends with the crank chamber 8 while the upper ends are selectively opened to the combustion chamber in the cylinder 10 according to the position of the piston 12.

Referring now to FIG. 3 which is a sectional view taken along the line III—III of FIG. 2, first and second auxiliary exhaust passages 16 and 17 are formed in the wall of the cylinder 10 at both circumferential sides of the main exhaust passage 15. These auxiliary exhaust passages 16 and 17 open into the combustion chamber in the cylinder independently and lead to intermediate portions of the main exhaust passage 15. The auxiliary exhaust passages 16 and 17 are adapted to be opened and closed by first and second control valves 18 and 19, respectively.

The exhaust control system of the invention has an expansion chamber 21 defined by the cylinder wall and an expansion chamber cover 20 attached to the cylinder wall. The first expansion passage 23 leads to the first control valve 18 so that the expansion chamber 21 is selectively brought into communication with the main exhaust passage 15 depending on the position of the first control valve 18. Similarly, the second expansion passage 4 leads to the second control valve 19 so that the expansion chamber 21 is communicated with the main exhaust passage 15 also through the second expansion passage 24 depending on the position of the second control valve 19.

The valves 18 and 19 have rod-like froms and are rotatably carried by valve bosses 25 provided on the cylinder 10. The valves 18 and 19 have semicylindrical passages 26 and 27, respectively. The arrangement is such that, when auxiliary exhaust passages 16 and 17 are sealed from the main exhaust passage 15, the expansion chamber 21 is communicated with the main exhaust passage 15 through the expansion passages 23 and 24 via the semicylindrical passages 26 and 27. To the contrary, when the auxiliary exhaust passages 16 and 17 are opened into the main exhaust passage 15, the expansion chamber 21 is disconnected from the main exhaust passage 15.

The valves 18 and 19 are operatively connected to, for example, a governor 30 (see FIG. 6) through a rack shaft 28, so that the state as shown in FIG. 3 is maintained when the engine speed is low. However, as the engine speed is increased, the first control valve 18 and the second control valve 19 are rotated in the directions of arrows A and B, respectively.

Figure 5:
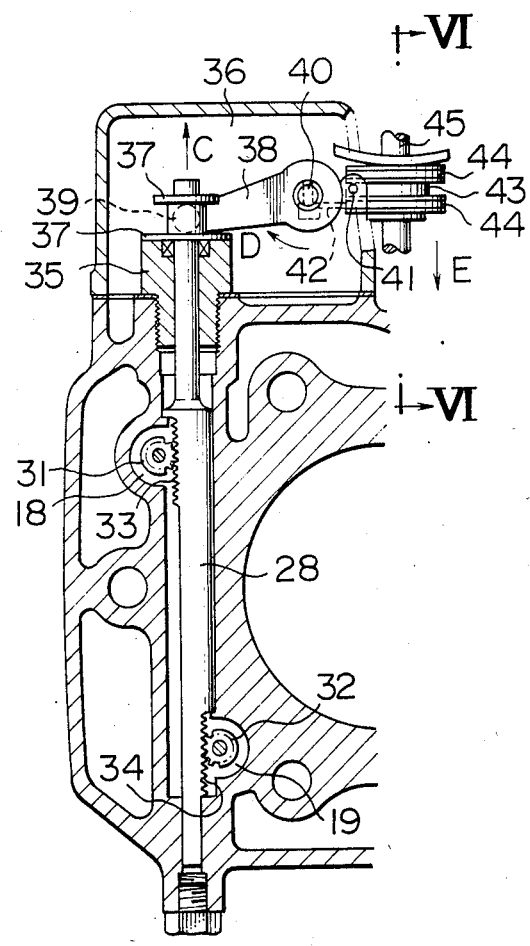
FIG. 5 is a sectional view taken along the line V—V of FIG. 2.

More specifically, referring to FIG. 5, the control valves 18 and 19 are disposed at opposite sides of the rack shaft 28. The control valves 18 and 19 are provided with pinions 31 and 32 integral therewith and meshing with teeth 33 and 34 on the rack shaft 28. The rack shaft 28 is supported by a boss 35 for free axial movement and projects into a transmission chamber 36. A pair of adjust plates 37 are provided on the portion of the rackshaft 28 projected into the transmission chamber 36. The adjust plates 37 clamp a vertical pin 39 on one end of a swing arm 38 which in turn is fixed to a vertical rotary shaft 40.

An arm 42 having a vertical pin 41 is fixed to the lower end of a rotary shaft 40. The pin 41 is clamped by a pair of annular adjuster plates 44 on the slider 43. The slider 43 engages with the governor shaft 45 axially slidably. The arrangement is such that axial sliding movement of the slider 43 causes a rotation of the rotary shaft 40 through the plate 44, pin 41 and the arm 42.

Figure 6:
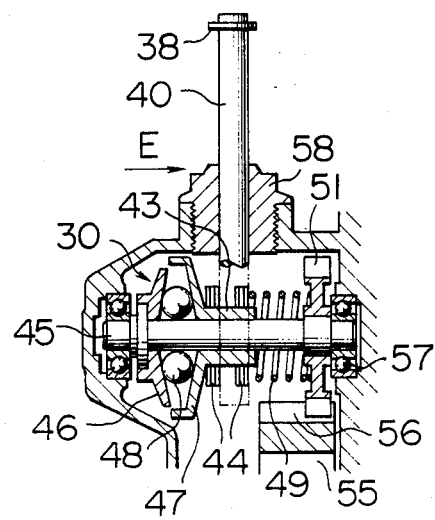
FIG. 6 is a sectional view taken along the line VI—VI of FIG. 5.

Referring now to FIG. 6 which is a sectional view taken along the line VI—VI of FIG. 5, the governor 30 has a pair of saucer-shaped discs 46 and 47, a plurality of centrifugal balls 48 clamped between both discs 46 and 47, and a governor spring 49. This type of governor is known as centrifugal ball type governor. The slider 43 is formed as a unit integrally with one 47 of the discs. The governor spring 49 is loaded between the adjuster plate 44 and a governor driving gear 51 so as to urge the disc 47 in the direction opposite to an arrow E (see FIG. 5) through the intermediary of the plate 44. The driving gear 51 is fixed to the governor shaft 45 supported by the bearing 57 and engages with a crank gear 56 on the crankshaft 55. The boss member 58 rotatably supports a vertical rotary shaft 40.

Figure 7:
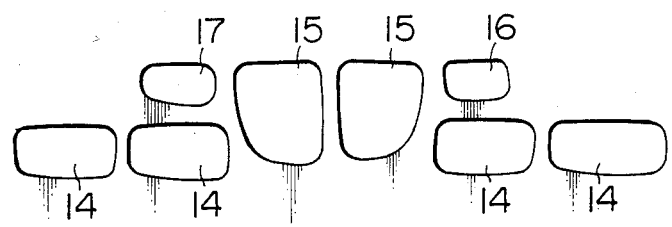
FIG. 7 is developed view of a cylinder wall as viewed in the direction of an arrow VII in FIG. 3.
Figure 8:
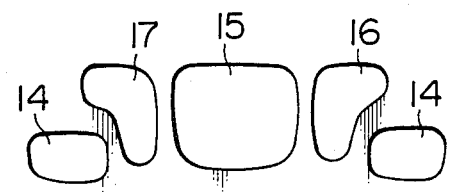
FIG. 8 is a developed view of the cylinder of an engine incorporating another embodiment of the invention.

FIG. 7 is a developed view of a part of the inner peripheral surface of the cylinder, showing the shapes and positions of openings of the main exhaust passage 15, auxiliary exhaust passages 16, 17 and the scavenging passage 14. The upper edges of the openings of the main exhaust passage 15 and the auxiliary exhaust passages 16, 17 are positioned at an equal level so that a constant timing of exhaust is maintained regardless of whether the auxiliary exhaust passages 16, 17 are opened or closed. The height or vertical length of the auxiliary exhaust passages 16, 17 is not greater than that of the main exhaust passage 15. The scavenging passages 14 open at a level below the lower edge of the auxiliary exhaust passages 16, 17.

In operation, when the engine speed is sufficiently low, only a small centrifugal force is applied to the centrifugal balls 48, so that the slider 43 does not slide in the direction of the arrow E. Therefore, the control valves 18 and 19 allow the expansion chamber 21 to communicate with an intermediate portion of the main exhaust passage 15 through the expansion passages 23 and 24, while interrupting the communication between the auxiliary exhaust passages 16, 17 and the main exhaust passage 15. In this state, the total cross-sectional area of the exhaust line coincides with the cross-sectional area of the main exhaust passage 15 matching with the engine characteristics at low speed range. At the same time, the pulsation of the exhaust pressure is absorbed so that the power of the engine is increased.

An increase of the engine speed causes a corresponding increase of the governor shaft 45 shown in FIG. 6. This in turn increases the centrifugal force applied to the balls 48 so that the balls 48 are displaced radially outwardly tending to move the disc 47 and the slider 43 in the direction of the arrow E against the force of the governor spring 49. This movement of the slider 43 in turn causes a rotation of the vertical rotary shaft 40 in the direction of an arrow D through the action of the pin 41 and the arm 42 as shown in FIG. 5. In consequence, the rack shaft 28 rotates in the direction of the arrow C through the action of the arm 38 and the pin 39 so that the first and the second control valves 18 and 19 are rotated in the directions of arrows A and B through the operation of the pinions 31 and 32 as shown in FIG. 3, gradually decreasing the areas of communication between the main exhaust passage 15 and the expansion passages 16, 17, while gradually increasing the areas of communication between the auxiliary exhaust passages 16, 17 and the main exhaust passage 15.

Therefore, the total area of the exhaust line, which is the sum of the cross-sectional area of the main exhaust passage 15 and the opening areas of the auxiliary exhaust passages 16, 17, is gradually increased in such a manner as to match with the engine operation characteristics at high speed and the power of the engine is increased. In addition, since the area of communication between the expansion chamber 21 and the main exhaust passage 15 is gradually decreased, the unfavourable effect of the expansion chamber 21 which becomes serious at higher engine speed due to disturbance of the flow of exhaust gas, is avoided advantageously. Although the expansion chamber 21 is gradually shut-off from the main exhaust passage 15, this does not matter because the pulsation of the exhaust pressure at high speed is gradually suppressed as the engine speed is increased.

During over running or maximum speed operation of the engine, the auxiliary exhaust passages 16, 17 are fully opened to the main exhaust passage 15 so that the total area of the exhaust line, which is the sum of the cross-sectional area of the main exhaust passage 15 and the opening areas of the auxiliary exhaust passages 16, 17, is maximized to the value which is the sum of the cross-sectional areas of the main and auxiliary exhaust passages 15 and 16, 17, matching for the over-running or the maximum speed operation of the engine. In this state, the turbulence of the exhaust gas due to the presence of the expansion chamber 21 is avoided because the expansion chamber 21 is perfectly shut-off from the main exhaust passage 15. At the same time, a remarkable increase of the engine power is attained because the auxiliary exhaust passages 16 and 17 are fully opened.

In the illustrated embodiment, the control valves 18 and 19 disposed at both sides of the main exhaust passages are adapted to be rotated in opposite directions. This arrangement permits an easy design and simple construction of the expansion passages 23 and 24 between the expansion chamber 21 and the control valve 18 and 19.

In the described embodiment, a single expansion chamber is provided and communicated with the main exhaust passage 15 through two control valves 18 and 19. This arrangement, however, is not exclusive and the exhaust control system of the invention can have two independent expansion chambers which are communicated with the main exhaust passage through respective control valves.

It is possible to operatively connect two control valves to each other through a link mechanism, although in the illustrated embodiment two control valves are actuated by independent mechanisms.

It is also possible to arrange such that two control valves operate with a certain phase difference, i.e., to provide a predetermined difference in the operation timing of two control valve, in conformity with the specification of the engine.

It is to be noted also that the governor-type control valve actuator of the illustrated embodiment can be substituted by a servo-motor which provide different angles of rotation in accordance with the output pulses from a pulse generator which in turn operates in accordance with an engine speed signal output from an engine speed sensor.

It is still possible to modify the illustrated embodiment such that the levels of the upper and lower edges of openings of the auxiliary exhaust passages 16, 17 are the same as those of the main exhaust passage 15.

Furthermore, the rotary-type control valves 18 and 19 may be substituted by sleeve-type valves.

As has been described, there is provided an exhaust control system for 2-cycle engines, having an expansion chamber and auxiliary exhaust passages. When the engine is operating at low speed, the expansion chamber is connected to the main exhaust passage so that the pulsation of the exhaust pressure is absorbed by the expansion chamber to contributes to an increase of the power of the engine, whereas, when the engine is operating at high speed, the auxiliary exhaust passages are opened to provide a greater area for the exhaust gas to optimize the exhausting condition and the expansion chamber is shut-off from the main exhaust passage to avoid any disturbance of the flow of exhaust gas. In consequence, a remarkable improvement in the efficiency of engine operation is attained both in the low- and high-speed range of engine operation.

In the illustrated embodiment, the auxiliary exhaust passages are formed at both sides of the main exhaust passage so that the change of the total area of exhaust line is made in symmetry at both sides of the main exhaust passage and a total area of the exhaust line large enough to ensure a smooth engine operation even at the over-speed or maximum speed of the engine.

Figure 9:
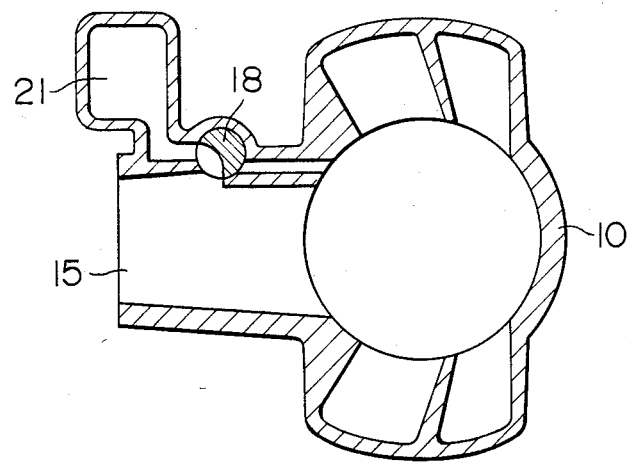
FIG. 9 is a sectional view of another embodiment corresponding to FIG. 3.

Further, it is to be noted that, instead of auxiliary exhaust passages arranged at both sides of the main exhaust passage as shown in the illustrated embodiment, one auxiliary exhaust passage arranged on one side of the main exhaust passage may be used, as shown in FIG. 9, with substantial advantages of the present invention maintained.

What is claimed is:

1. An exhaust control system for 2-cycle engine comprising: a main exhaust passage opening into the combustion chamber; at least one auxiliary exhaust passage opening into said combustion chamber on the side of the main exhaust passage and leading to an intermediate portion of said main exhaust passage; a control valve provided in said auxiliary exhaust passage and adapted to selectively shut-off said at least one auxiliary exhaust passage; an expansion chamber communicatable with said main exhaust passage through said control valve; and a valve operating means for operating said control valve such that, when said engine is operating at low speed, said control valve allows said expansion chamber to be communicated with said main exhaust passage while shutting off said at least one auxiliary exhaust passage and, as the engine speed is increased, said control valve gradually shut off said expansion chamber from said main exhaust passage while gradually opening said at least one auxiliary exhaust passage.

* * * * *